US010764625B2

(12) United States Patent
Maier (10) Patent No.: US 10,764,625 B2
(45) Date of Patent: Sep. 1, 2020

(54) SMART TOUCH

(71) Applicants: fm marketing gmbh, Neumarkt am Wallersee (AT); Ferdinand Maier, Neumarkt am Wallersee (AT)

(72) Inventor: Ferdinand Maier, Neumarkt am Wallersee (AT)

(73) Assignee: fm marketing gmbh, Neumarkt am Wallersee (AT)

( * ) Notice: Subject to any disclaimer, the term of this patent is extended or adjusted under 35 U.S.C. 154(b) by 0 days.

(21) Appl. No.: 16/330,489

(22) PCT Filed: Aug. 31, 2017

(86) PCT No.: PCT/EP2017/071907
§ 371 (c)(1),
(2) Date: Mar. 5, 2019

(87) PCT Pub. No.: WO2018/046389
PCT Pub. Date: Mar. 15, 2018

(65) Prior Publication Data
US 2019/0200069 A1    Jun. 27, 2019

(30) Foreign Application Priority Data
Sep. 8, 2016  (DE) .................. 10 2016 010 920

(51) Int. Cl.
*H04N 21/422* (2011.01)
*G06F 3/0482* (2013.01)
(Continued)

(52) U.S. Cl.
CPC ....... *H04N 21/4221* (2013.01); *G06F 3/0482* (2013.01); *G06F 3/04845* (2013.01);
(Continued)

(58) Field of Classification Search
None
See application file for complete search history.

(56) References Cited

U.S. PATENT DOCUMENTS 6,765,557 B1 *  7/2004  Segal .................... G06F 3/0488
                                                         345/173
9,535,594 B1 *  1/2017  Alonso Ruiz ....... H04M 1/7253
(Continued)

FOREIGN PATENT DOCUMENTS

DE      102013012474 A1    1/2015

OTHER PUBLICATIONS

International Search Report, PCT/EP2017/071907, dated Nov. 13, 2017, 2 pages.
(Continued)

*Primary Examiner* — Alexander Q Huerta
(74) *Attorney, Agent, or Firm* — Stinson LLP (57) ABSTRACT

A method for controlling a menu displayed on a screen from a number of menu elements arranged in a grid with an input interface containing a pushbutton with a number of haptically detectable segments arranged in the grid, wherein the number of menu elements corresponds to the number of haptically detectable segments so that a haptically detectable segment on the pushbutton is assigned to each menu element of the menu, comprising receiving a position signal that depends on the position of a user's finger on the pushbutton; highlighting the menu element assigned to the haptically detectable menu element located at the finger's position; and activating a function assigned to the highlighted menu element if the pushbutton is pressed.

8 Claims, 6 Drawing Sheets

(51) Int. Cl.
*G06F 3/0488* (2013.01)
*G06F 3/0489* (2013.01)
*G06F 3/0484* (2013.01)
*H04N 21/482* (2011.01)

(52) U.S. Cl.
CPC ...... *G06F 3/04886* (2013.01); *G06F 3/04895* (2013.01); *H04N 21/4821* (2013.01)

(56) References Cited

U.S. PATENT DOCUMENTS

| | | | | |
|---|---|---|---|---|
| 2009/0109183 A1* | 4/2009 | Carvajal | .............. | H04N 5/4403 345/173 |
| 2012/0274547 A1* | 11/2012 | Raeber | ............... | H04N 21/4312 345/156 |
| 2012/0319827 A1* | 12/2012 | Pance | .................... | G06F 3/016 340/407.1 |
| 2013/0268894 A1 | 10/2013 | Jeon et al. | | |
| 2015/0007232 A1* | 1/2015 | Martch | .................. | G08C 17/02 725/44 |
| 2015/0074552 A1* | 3/2015 | Chai | .................. | H04N 21/4826 715/753 |
| 2015/0074721 A1* | 3/2015 | Fishman | ............ | H04N 21/4821 725/45 |
| 2015/0177983 A1* | 6/2015 | Shin | .................... | G06F 3/04842 715/773 |
| 2015/0378598 A1* | 12/2015 | Takeshi | .................. | G06F 3/016 715/773 |
| 2016/0070399 A1 | 3/2016 | Hotelling | | |
| 2016/0070410 A1* | 3/2016 | Lin | ....................... | G06F 3/0421 345/173 |
| 2017/0255317 A1* | 9/2017 | Henty | .................. | G06F 3/0202 |

OTHER PUBLICATIONS

Written Opinion, PCT/EP2017/071907, dated Nov. 13, 2017, 6 pages.

* cited by examiner

SMART TOUCH

REFERENCE TO RELATED APPLICATIONS

This application is a U.S. national stage application of International Patent Application No. PCT/EP2017/071907, filed Aug. 31, 2017, and claims the benefit of priority of German Application No. 10 2016 010 920.3, filed Sep. 8, 2016, the entire disclosures of which are incorporated herein by reference.

FIELD OF THE INVENTION

The present invention relates to a method for controlling a menu displayed on a screen.

BACKGROUND

A method for controlling a menu displayed on a screen is known, for example, from DE 10 2013 012 474 A1. The menu there consists of a number of menu items arranged in a grid, and is controlled directly via the touchscreen displaying the menu as input interface.

SUMMARY OF THE INVENTION

It is the object of the invention to improve the menu control.

The invention proposes a method for controlling a menu displayed on a screen having a number of menu items arranged in a grid with an input interface comprising a pushbutton with a number of haptically perceptible segments which are arranged in a grid, wherein the number of the menu items corresponds to the number of the haptically perceptible segments, so that a haptically perceptible segment on the pushbutton is assigned to every menu item of the menu. According to the invention, the method comprises the steps Receiving a position signal which depends on the position of a finger of a user on the pushbutton, Highlighting the menu item which is assigned to the haptically perceptible menu item which is at the position of the finger, and Triggering a function assigned to the highlighted menu item if the pushbutton is activated.

The process presented is based on the motivation to use menu controls in the shape of grids or tiles, as known from smartphones or from the method mentioned at the outset, also on remote controls for controlling a television. These basically very user-friendly menus would supersede the time-consuming moving to a menu item by means of a cursor element, such as a control ring, when controlling a television with a remote control, which can be very frustrating over time, in particular in the case of menus with a high number of grids.

Traditional menus in the shape of grids or tiles, however, can only be controlled by a touchscreen because the user needs to have direct visual contact both with the menu itself and his finger. Therefore, it is not possible to use the grid and tile-shaped menus on remote controls with a touchscreen. Even if a remote control is equipped with a touchscreen, the user still needs to have direct visual contact with the touchscreen and with his finger, otherwise he would not be able to select the appropriate menu items.

It would be possible for the user to learn the individual menu items by heart. Even if the user had the necessary cognitive capacities, this is very difficult if you have to branch off in menus with menu items which have the function to open a sub-menu. The user would not only have to memorize the main menu and the individual sub-menus, he would also have to know which sub-menu he is in if he has no visual contact with the remote control touchscreen.

It is the proposal of the invention to design the input interface like the one in a smartphone, i.e. with a touch-sensitive sensor. Unlike the design of a smartphone, the touch-sensitive sensor is executed as pushbutton with a haptically perceptible grid which corresponds to the grid or tile-shaped menu. In this way, due to the touch sensitivity of the pushbutton, the screen displaying the menu can always show the location of the user's finger without the user having to interact visually with the pushbutton. He only has to feel the grid on the pushbutton and is then able to conveniently control the menu similar to a smartphone via his visual contact with the screen. The pushbutton may therefore be executed according to the principle of a touchpad or according to the principle of a touchscreen. The invention would allow both principles. In no case does the user have to look at the pushbutton for activating the pushbutton and the grid thereon.

The stated method can thus be used to control a screen via a remote control in a very user-friendly manner.

In an embodiment of the stated method, the respective menu item is enlarged to highlight the menu item. In this way, the menu can also be controlled in a reliable and user-friendly manner over a great distance between user and screen.

In an additional embodiment of the stated method, background information on the function assigned to the menu item is displayed with the enlarged menu item. The background information can be displayed in any manner, but should serve the user as a kind of guide to find his way in the menu by allowing a so-called precognition. The background information therefore preferably comprises either the following options for interacting with the menu and/or miniaturized media contents. This has the advantage that the user does not have to memorize the individual functions assigned to the menu item. It is easy for the user to grasp it when controlling the menu. It is noticeably easier to learn how to handle a new television and its remote control because the user can now learn the operation and the scope of functions of the system while controlling them. It is no longer necessary to study the operating instructions beforehand. In this way, the user-friendliness is further increased.

In a particular embodiment of the stated method, at least some of the menu items of the menu and their assigned functions as well as the respective background information comprise the playback of a predetermined media content. The playback of a media content in the enlarged menu item can be executed with comparably low computing resources and thus very quickly. In this way, the user quickly and reliably gets an idea of the media content, and can make a target-oriented decision concerning the selection of a menu item. This further improves the user-friendliness.

In a further embodiment of the stated method, the input interface is a remote control, wherein the position signal is received wirelessly by the remote control.

According to a further aspect of the invention, a control device is set up to carry out one of the stated methods.

In a further embodiment of the stated device, the stated device has a memory and a processor. The stated method is saved in the memory in the form of a computer program and the processor is provided for executing the method when the computer program is loaded from the memory into the processor.

According to a further aspect of the invention, a computer program comprises program coders for executing all the steps of the stated method when the computer program is executed on a computer or one of the stated devices.

According to a further aspect of the invention, a computer program product contains a program code which is saved on a computer-readable data carrier and which carries out the stated method when it is executed on a data processing device.

In accordance with a further aspect of the invention, a playback device comprises a screen for displaying a menu from a number of menu items arranged in a grid and one of the previously mentioned control devices.

In accordance with a further aspect of the invention, a remote control comprises a pushbutton with a number of haptically perceptible segments arranged in a grid, a position sensor for detecting a position of a finger of a user on the grid, and a transmission interface for sending a position signal depending on the position of a finger of a user on the pushbutton, as well as a trigger signal when the pushbutton is pushed by the user.

In accordance with a further aspect of the invention, a multimedia system comprises one of the said playback devices and the previously indicated remote control.

The above-described properties, features and advantages of this invention, as well as the manner in which they are achieved, will become clearer in connection with the following description of the embodiments, which are described in more detail in connection with the drawings, in which:

In the drawings, the same technical elements are provided with the same reference signs, and are only described once. The drawings are purely schematic, and, in particular, do not reflect the actual geometric proportions.

DETAILED DESCRIPTION OF PREFERRED EMBODIMENT

Figure 1:
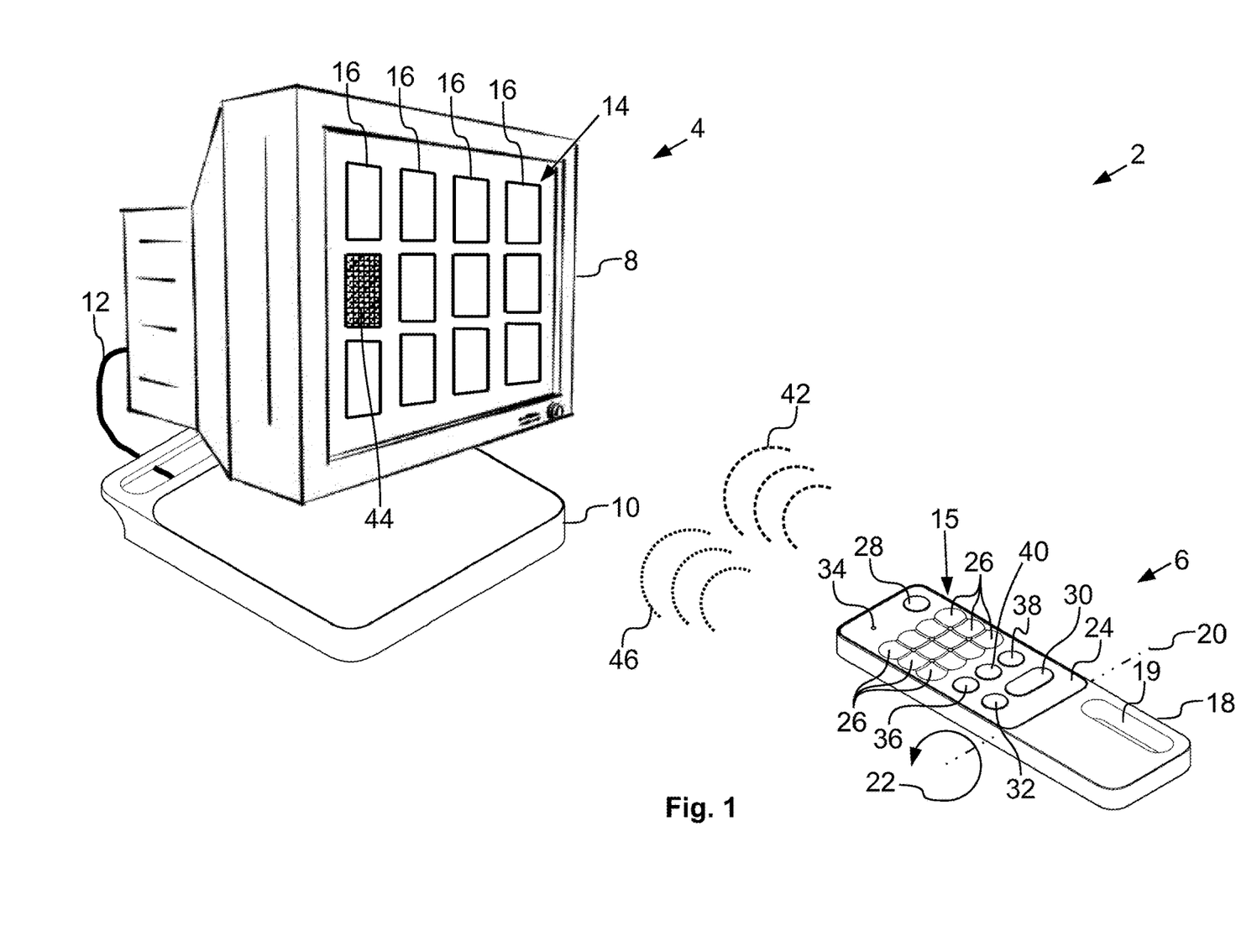
FIG. 1 is a schematic representation of a multimedia system with a playback device and a remote control.

Reference is made to FIG. 1, which is a schematic representation of a multimedia system 2 with a playback device 4 and an input interface in the form of a remote control 6. The multimedia system 2 is designed to play back media contents, still to be described in more detail, on a screen 8 of the playback device 4. The image signals which are required for presenting the media contents on the screen 8 are generated in a control device in the form of a set top box 10 in a manner known per se, and transmitted to the screen 8 via a data cable 12 in a manner known per se. For the sake of brevity, this shall not be described in any further detail.

One example for a media content displayed on the screen 8 is a menu 14 indicated on the screen 8 in FIG. 1. The menu 14 comprises a number of twelve menu items 16 which are arranged in a grid 15 referenced in FIG. 2. For the sake of clarity, not all these menu items 16 are given their own reference signs in FIG. 1.

The menu 14 is used to control the function of the set top box 10 and the playback of other media contents via the remote control 6. Before this control is explained further, the design of the remote control shall first be explained in detail.

Figure 2:
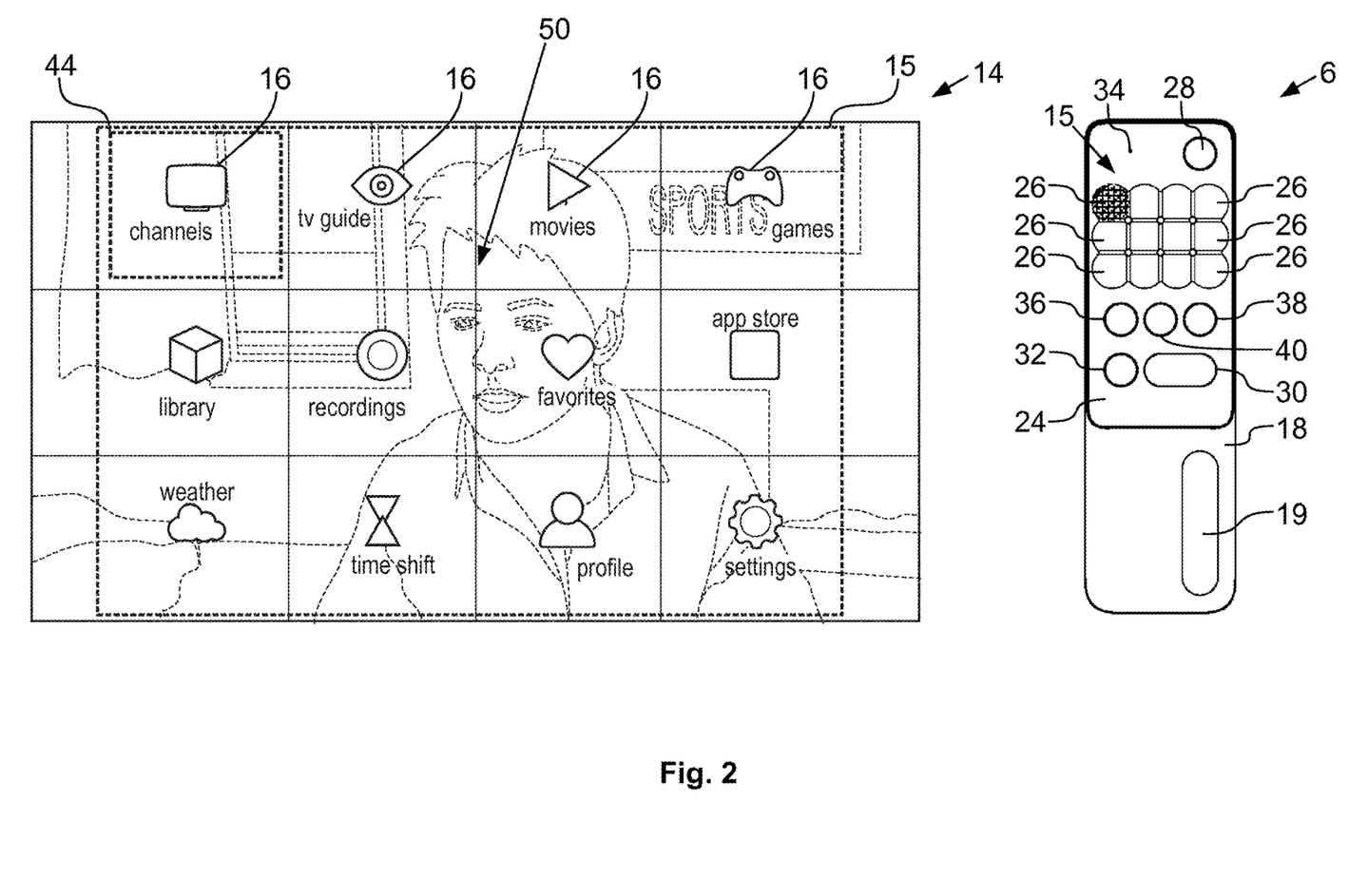
FIG. 2 is a menu on a screen of the multimedia system of FIG. 1.

The remote control 6 comprises a metal housing 18 with a passage opening 19, among other things, to reduce the weight. A plastic pushbutton 24, which is held in the housing 18, can be swiveled around an axis 20 in and against a direction of rotation 22. A number of twelve haptically perceptible segments in the form of depressions 26 are arranged on this pushbutton 24 in the same grid 15 as the grid 15 of the menu 14 on the screen 8. Each of the depressions 26 on the remote control 6 is assigned a menu item 16 of the menu.

The remote control 6 also comprises buttons which penetrate the pushbutton 24, and which can be pushed independently of it. It includes an On/Off button 28 for activating the entire multimedia system 4 or only a part of it, or putting it into standby, a volume rocker key 30 for controlling a volume of the media playback, and a speech recognition activation button 32 for activating a control of the multimedia system 2 by means of speech via a microphone 34.

The buttons which can be pushed independently from the pushbutton 24 also include a scrolling button 36, a second scrolling button 38, and a return button 40 which shall be described in more detail later in the description of controlling the function of the set top box 10 by means of the remote control 6. To distinguish the pushbutton 24 from the remaining buttons 30 to 40, they can be executed optionally in high gloss compared to the pushbutton 24.

A user using the remote control 6 for controlling the function of the set top box 10 can place his finger in any of the depressions 26. Underneath the pushbutton 24, a non-visible electronics assembly is arranged in the housing 18 of the remote control 6 having a position sensor which is not shown for detecting in which depression 26 the user's finger has been put, and which transmits a corresponding position signal 42 to the set top box 10 with a transmission interface not shown here.

The set top box 10 then recognizes the depression 26 in which the user's finger is put by means of the position signal 42, and marks the menu item 16 assigned to this depression 26 with a highlighting 44 indicated with hatching in FIG. 1.

If the user moves his finger and puts it in another depression 26, the remote control 6 transmits the movement of the finger with the position signal 42 via the transmission interface, so that the set top box 10 can move the highlighting 44 accordingly. In this way, the user can always see which depression 26 he has his finger in.

If the user's finger is in a depression 26 which is assigned to a menu item 16 which the user wants to select for controlling the set top box 10, he pushes the pushbutton 24 down around the axis 20. The electronics assembly of the remote control 6 which is not shown here detects this pressure and transmits a corresponding trigger signal 46 to the set top box 10, also via the transmission interface for activating the function assigned to the currently highlighted menu item 16.

Figure 3:
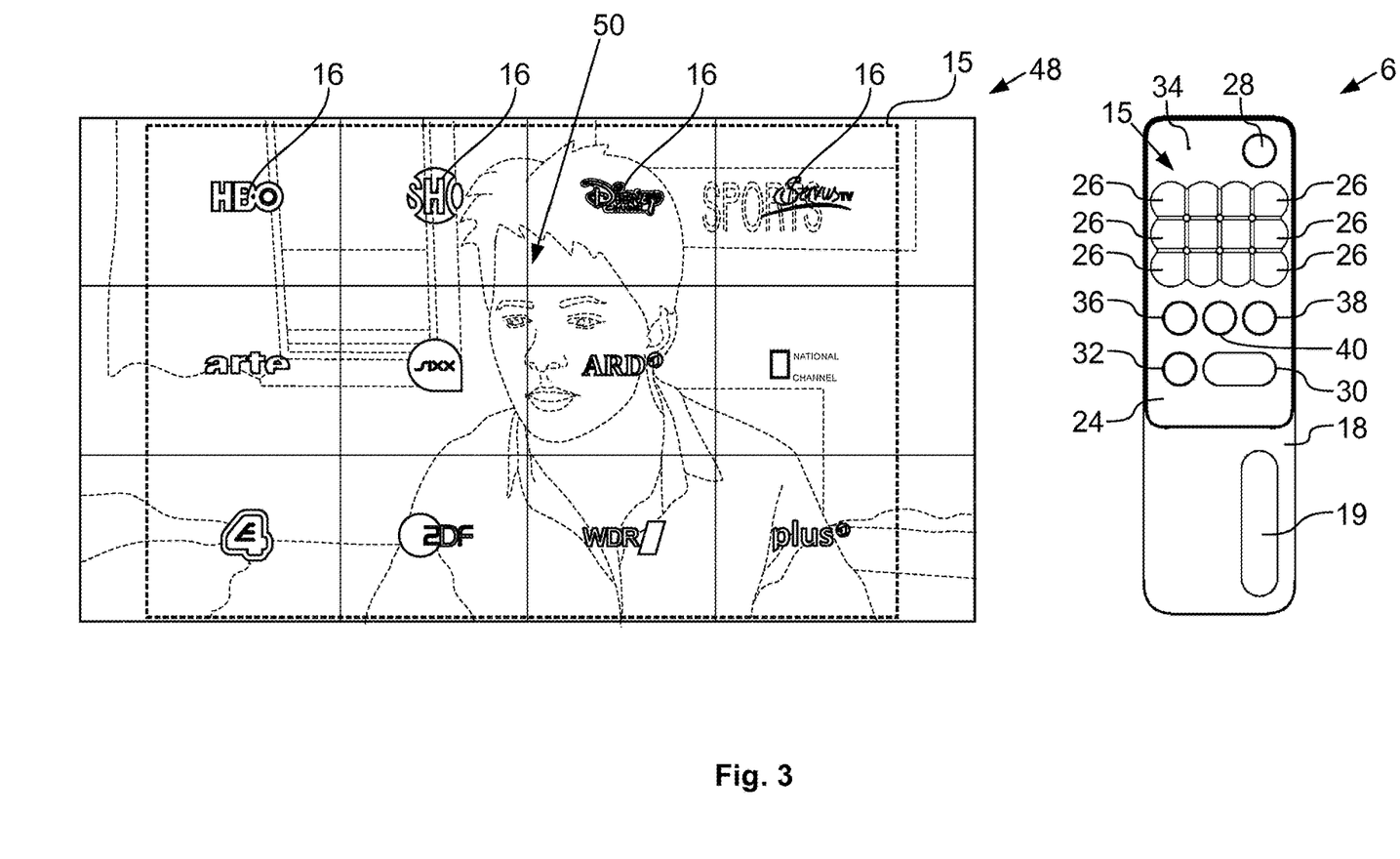
FIG. 3 is a sub-menu of the menu in FIG. 2 in a first functional condition.

This function can be random, and may comprise, for example, the opening of a sub-menu 48 indicated in FIG. 3, the activation of a program, or the start of a media playback. If the menu 14 should provide more functions than menu items 16 are available on the screen, i.e. should the number of the functions to be controlled in the present embodiment exceed the number twelve, the two scrolling button 36, 38 can be used to navigate in the larger menu. Should the user be in the sub-menu 48 shown in FIG. 3 and wants to return to the superordinate menu 14, he can activate the return button 40.

In the following, the method for controlling the playback device 4 with the remote control 6 shall be described by means of FIGS. 2 to 6 within the framework of a specific example. For this purpose, FIGS. 2 to 6 show exemplary menus 14, 48 and a plan view of the remote control 6 for illustrating the dependencies of the grids 15 of the menu items 16 on the screen 4, and the depressions 26 on the remote control 6 on each other. These menus 14, 48 are superimposed in the FIGS. 2 to 6 of a current media playback, here to be seen in the form of a television picture 50.

First, a potential menu 14 as main menu is further described by means of FIG. 2.

The menu 14 can provide a wide range of different selectable functions via its individual menu items 16 which are marked directly in FIG. 2 for the sake of clarity. Parts of these functions can be sub-menus themselves, for example the menu item 16 named "settings", which is a sub-menu for selecting various possible settings for the playback device 4. Other functions, however, can be programs which can be executed directly, for example the menu item 16 named "weather" which can be used by the user to call up weather data over the Internet.

For selecting a menu item 16, the user puts his finger on a depression 26, and the set top box 10 marks the menu item 16 assigned to this depression 26 in the previously described manner with a highlighting 44. The highlighting 44 is indicated in FIG. 2 with a dotted outline, whereas the depression 26, in which the user has put his finger, is indicated with a hatching. In the present embodiment according to FIG. 2, the user puts his finger in the depression 26 to which the menu item 16 is assigned, which leads to a sub-menu 48 offering a selection of available TV channels.

This sub-menu 48 is described in FIG. 3 in a condition in which the user initially does not touch the pushbutton 24 of the remote control 6. This is why no highlighting 44 is indicated or shown in FIG. 3. The selectable menu items 16 are assigned here to media-as-a-service channels which can be selected by the user for playback. These are multimedia offers which are not saved locally on the set top box 10, but can be received and played back via a receiving interface of the set top box 10 which is not shown. Such media-as-a-service channels are, for example, TV channels or streaming channels on the Internet.

Figure 4:
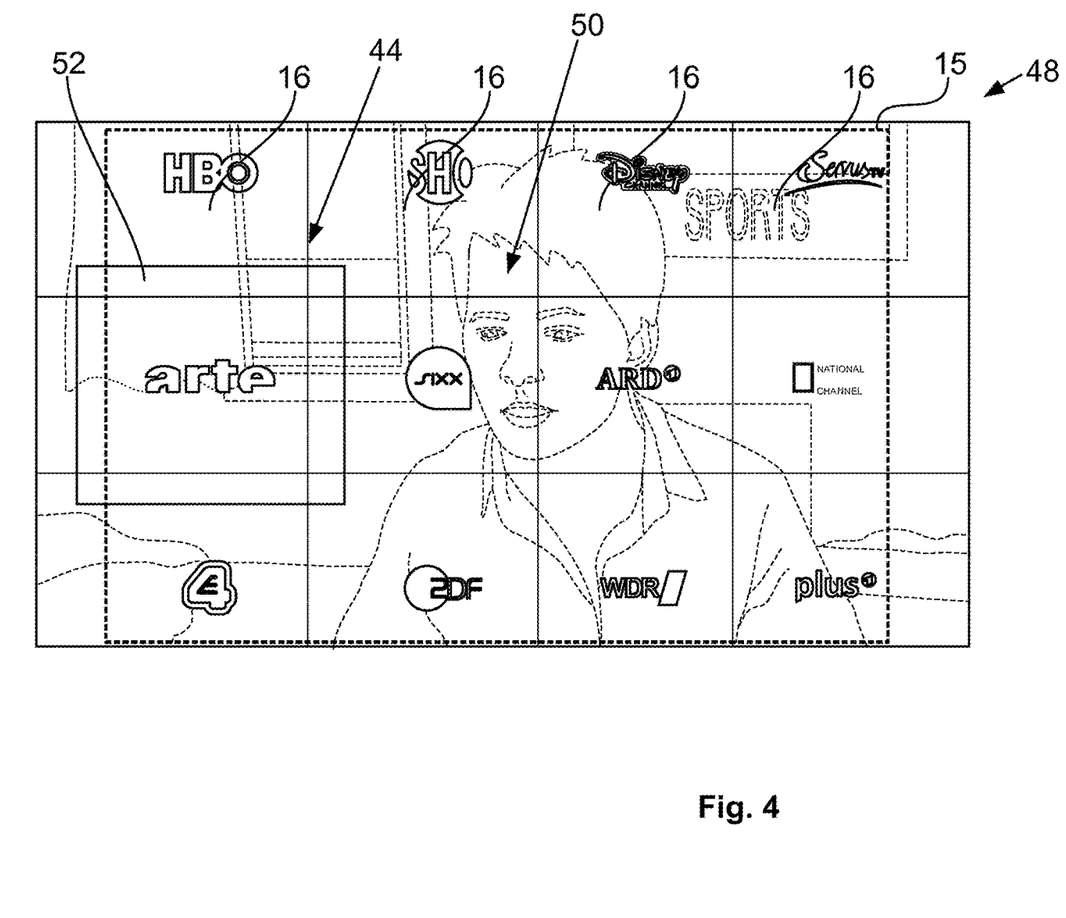
FIG. 4 is the sub-menu of FIG. 3 in a second functional condition.

The hatching in FIG. 4 shows how the user puts one of his fingers in one of the depressions 26. The set top box 10 marks the menu item 16 assigned to this depression 26 accordingly with a highlighting 44 which is shown in FIG. 3 as enlargement 52 of the indicated menu item 16, so that the user can see the selected menu item more clearly. Once the user pushes down the pushbutton 24 in the manner described above, the sub-menu 48 disappears and the set top box 10 switches from the current television picture 50 to the media-as-a-service channel selected with the menu item 16. The user can then always activate the return button 40 to show the main menu 14 from FIG. 2, and start the menu control from the beginning.

Figure 5:
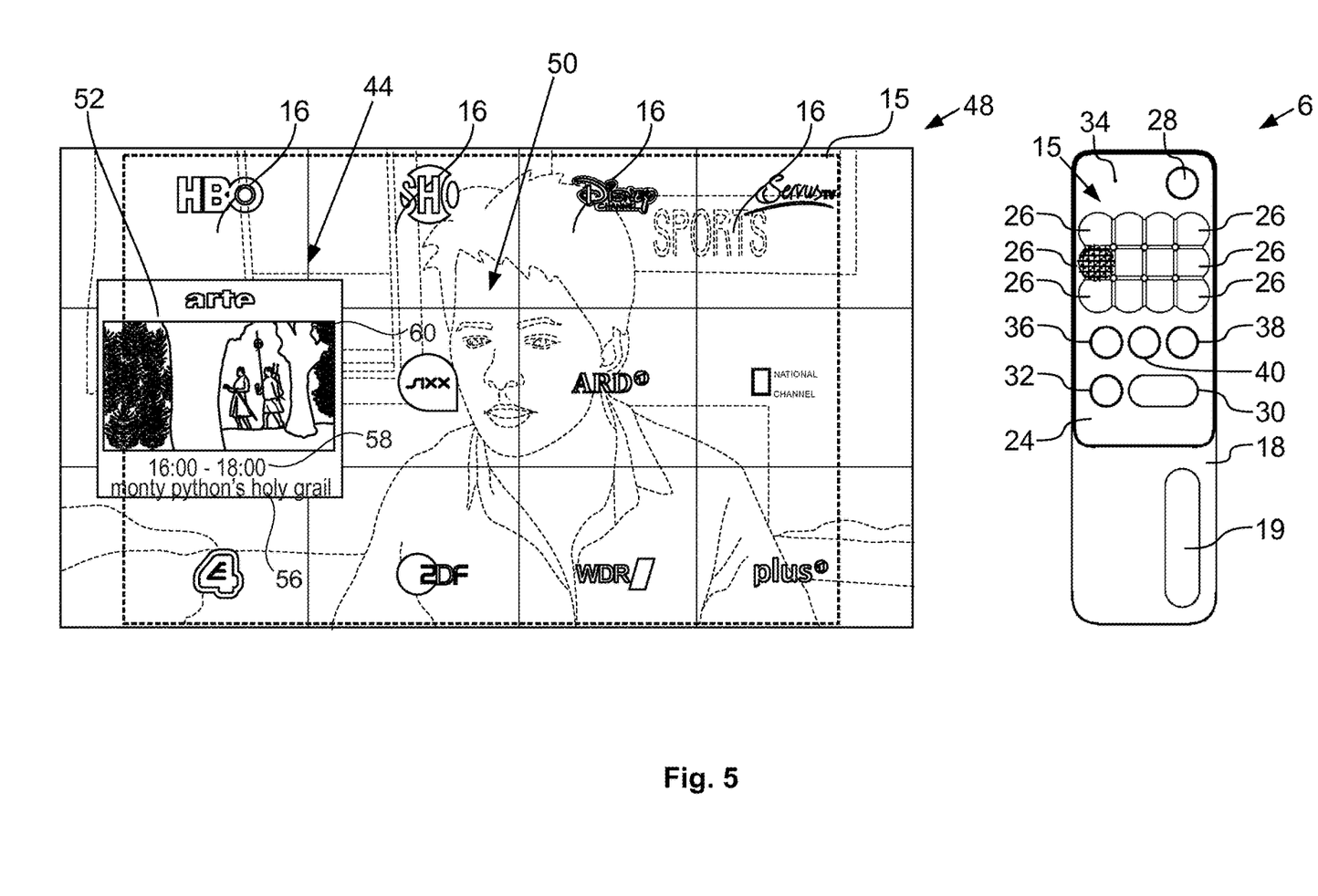
FIG. 5 is the sub-menu of FIG. 3 in an alternative second functional condition.

FIG. 5, which basically still shows the sub-menu 48 of FIGS. 3 and 4, shows an embodiment of the highlighting 44. Background information on the function which is assigned to the menu item 16 selected via the depressions 26 is shown in the further highlighting 44.

In FIG. 5, the background information shows the name 56 of a currently running movie which is available via the media-as-a-service channel of the highlighted menu item 16. The background information also contains a time 58, stating the period in which the movie is broadcast which is available via the previously mentioned media-as-a-service channel. Finally, the background information shows a reduced media playback 60 of the previously mentioned movie in the foreground in addition to the TV program 50 running in the background.

The background information 56, 58, 60 allows the user to decide even before pushing the pushbutton 24, whether he actually wants to see the media content selectable via the menu item 16.

Figure 6:
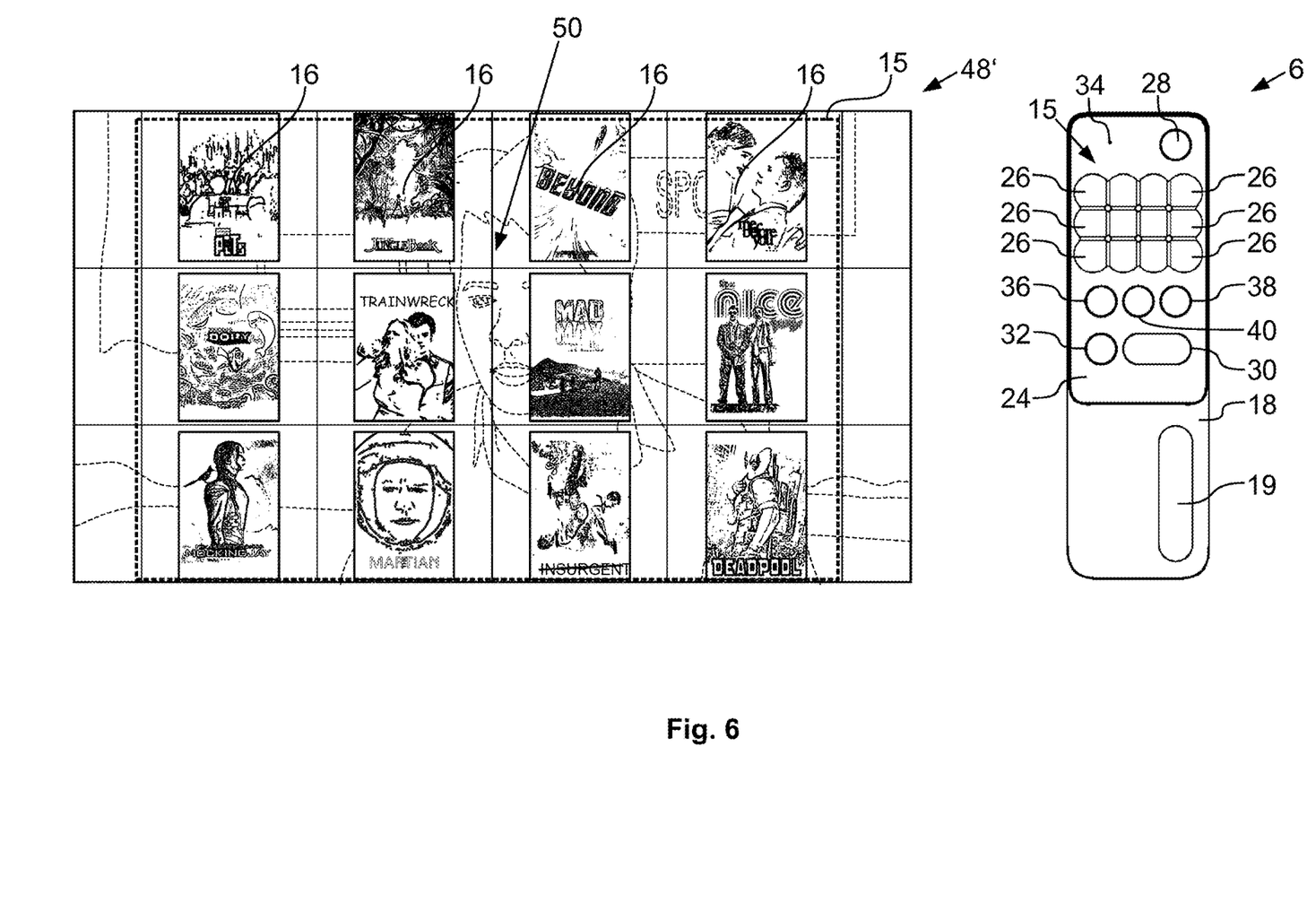
FIG. 6 is an alternative sub-menu to the menu in FIG. 2.

FIG. 6 show an alternative sub-menu 48'. The sub-menu 48' belongs to the menu item 16 of FIG. 2 named "movies". The menu items can be used, for example, to select media contents such as movies stored on the set top box 10 unlike the media-as-a-service channels.

The sub-menus 48, 48' described in FIGS. 3 to 6, clearly show the function of the scrolling keys 36, 38, because usually the two sub-menus 48, 48' contain much more media than the grid 15 can show at once. In this case, the scrolling keys 36, 38 can be used to easily scroll back and forth between the media contents.

The menu sequence shown in FIGS. 2 to 6 is as easy as with a smartphone. Compared to a smartphone, the user does not need to see his fingers when he navigates through the menus. He finds his way in the menu 14 only through the use of the haptics of the pushbutton 24 and the highlighting 16 which is shown when the user puts his finger in one of the depressions. Cumbersome navigation with a cursor element for selecting a menu item is not required.

The invention claimed is:

1. A method for controlling a menu displayed on a screen with a number of menu elements arranged in a grid with an input interface, that contains a pushbutton with a number of haptically detectable segments arranged in the grid, wherein the pushbutton is configured to rotate about an axis when pressed, and wherein the number of menu elements corresponds to the number of haptically detectable segments so that a haptically detectable segment is assigned to each menu element of menu on the pushbutton, the method comprising:
    receiving a position signal that depends on the position of a user's finger on the pushbutton relative to the haptically detectable segments arranged in the grid on the pushbutton;
    highlighting the menu element assigned to the haptically detectable segment located at the finger's position;
    detecting the user pressing the pushbutton such that the pushbutton rotates about the axis; and
    activating a function assigned to the highlighted menu element in response to the user pressing the pushbutton.

2. The method according to claim 1, wherein the highlighting of the menu element assigned to the haptically detectable menu element located at the finger's position is by enlarging said menu element.

3. The method according to claim 2, wherein background information on the function assigned to the menu element is displayed in the enlarged menu element.

4. Method as claimed in claim 3, wherein the function assigned to the enlarged menu item and the background information comprise the playback of a specified media content.

5. The method according to claim 1, wherein the input interface is a remote control and the position signal is transmitted wirelessly by the remote control to a set top box.

6. A remote control comprising:
a pushbutton with a number of haptically perceptible segments arranged in a grid and corresponding to a number of menu elements of a menu displayed on a screen, the haptically perceptible segments each assigned to one of the menu elements, the pushbutton configured to rotate about an axis when pressed;
an independent button that can be pushed independent of the pushbutton, the independent button having a function assigned thereto and configured to cause a set top box to activate the assigned function in response to user pressing the independent button;
a position sensor for detecting a position of a finger of the user on the grid relative to the haptically perceptible segments arranged in the grid on the pushbutton, the menu element assigned to the haptically perceptible segment located at the detected position of the finger being highlighted; and
a transmission interface for sending a position signal depending on the position of the finger of the user on the pushbutton, as well as a trigger signal when the pushbutton is pushed by the user such that the pushbutton rotates about the axis, the transmission interface configured to send the trigger signal to the set top box in response to the user pressing the pushbutton to cause the set top box to activate a function assigned to the highlighted menu element in response to the trigger signal.

7. The remote control of claim 6 in combination with a playback device in a multimedia system.

8. The remote control of claim 6 designed to execute a method for controlling a menu displayed on a screen with a number of menu elements arranged in a grid with an input interface that contains said pushbutton with the number of haptically detectable segments arranged in the grid, wherein the number of menu elements corresponds to the number of haptically detectable segments so that a haptically detectable segment is assigned to each menu element of menu on the pushbutton; the method comprising:
   receiving a position signal that depends on the position of a user's finger on the pushbutton;
   highlighting the menu element assigned to the haptically detectable menu element located at the finger's position; and
   activating a function assigned to the highlighted menu element if the pushbutton is pressed.

* * * * *